(12) United States Patent
Duffy

(10) Patent No.: US 6,406,509 B1
(45) Date of Patent: Jun. 18, 2002

(54) EXTRUDED PROFILE FILTER FRAMING

(75) Inventor: Dean Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/346,250

(22) Filed: Jul. 1, 1999

(51) Int. Cl.$^7$ ............................................ B01D 39/00
(52) U.S. Cl. ............................ 55/492; 55/493; 55/495; 55/497; 55/501; 55/502; 55/511; 156/212
(58) Field of Search ........................ 55/490, 492, 493, 55/495, 497, 501, 502, 511, DIG. 31; 156/212, 293, 303.1

(56) References Cited

U.S. PATENT DOCUMENTS

| | | | |
|---|---|---|---|
| 1,832,281 A | | 11/1931 | Davies |
| 2,032,262 A | | 2/1936 | Cori ............................ 183/71 |
| 2,058,669 A | | 10/1936 | Dollinger ...................... 183/71 |
| 3,296,781 A | | 1/1967 | Schumann ..................... 55/497 |
| 3,513,643 A | | 5/1970 | Tarala ........................... 55/473 |
| 4,323,379 A | * | 4/1982 | Shearin ................... 55/DIG. 31 |
| 4,386,948 A | | 6/1983 | Choksi et al. ................. 55/499 |
| 4,636,233 A | * | 1/1987 | Lizmore |
| 4,692,177 A | | 9/1987 | Wright et al. .................. 55/499 |
| 4,963,171 A | | 10/1990 | Osendorf |
| 5,032,272 A | * | 7/1991 | Mould .................... 55/DIG. 31 |
| 5,188,646 A | | 2/1993 | Nolen, Jr. |
| 5,599,446 A | | 2/1997 | Junker et al. ................ 210/230 |
| 5,792,229 A | | 8/1998 | Sassa et al. .................... 55/497 |
| 6,162,272 A | * | 12/2000 | Michaelis et al. |

FOREIGN PATENT DOCUMENTS

| | | |
|---|---|---|
| DE | 197 46 804 A1 | 4/1998 |
| FR | 2 398 531 | 2/1979 |
| JP | 7-299317 | 11/1995 |
| WO | WO 94/11089 | 5/1994 |
| WO | WO 96/29138 | 9/1996 |
| WO | WO 98/20961 | 5/1998 |

* cited by examiner

Primary Examiner—Betsy Morrison Hoey
(74) Attorney, Agent, or Firm—Gary L. Griswold; Robert W. Sprague; William J. Bond (57) ABSTRACT

A framed filter media comprising a filter media having a fluid inlet face and a fluid outlet face with peripheral sidewalls. The peripheral sidewalls are attached to a strip frame by an adhesive-potting compound. The continuous strip frame is formed into three or more (up to an infinite number if the sidewall sections(s) is formed into a circular filter frame) sidewall sections having a substantially flat sidewall and at least two projecting filter retaining tabs which form a channel on a first face of the sidewall section for containing the adhesive potting compound. The sidewall sections are separated by corner notches extending through the retaining tabs at least to the substantially flat sidewalls. Two terminal sidewall sections meet to form a seam such that the sidewall sections circumscribe the filter media peripheral sidewalls. The continuous strip frame is formed by extruding a continuous strip frame blank comprising at least a substantially flat sidewall and at least two projecting filter retaining tabs forming a continuous channel on a first face of the continuous strip frame blank. The filter retaining tabs are then notched to form corner notches which corner notches extend at least to the substantially flat sidewalls creating sidewall section between the corner notches and optionally scoring first and/or second faces of the sidewall portions to form living hinges. The continuous strip frame blank is further cut into discrete strip frame blanks.

28 Claims, 6 Drawing Sheets

EXTRUDED PROFILE FILTER FRAMING

BACKGROUND AND FIELD OF THE INVENTION

This invention is directed at a unitary filter frame capable of being formed by a continuous extrusion process.

Conventionally three dimensional filter frames are formed by injection molding or similar type processes. In its simplest variation, the frame is directly formed as a unitary structure. A simple technique for this is described in U.S. Pat. No. 2,032,262 where a pleated filter is held in a jig with only the edge portions extending out of the jig. This jig is then inserted into a mold form and a plastic type material is injected, embedding the exposed pleat edges in the space between the jig and the mold form. Similarly, U.S. Pat. No. 5,792,229 shows an elastomeric filter frame formed directly on a pleated filter media by injection molding a foaming resin into the pleats of the pleated filter along the periphery of the pleated filter in one embodiment of the invention described. This filter requires a separate rigid frame in which the filter is fit into the frame by a friction type fit. This however, would likely result in a non-airtight seal allowing bypass around the framed filter. A preformed molded frame is described in U.S. Pat. No. 3,296,781. The filter media is subsequently attached to the molded frame by use of an adhesive or the like.

Three-dimensional filter frames can also be formed from multiple pieces, which are then assembled by use of adhesive, welding, friction fit, snap fits, mechanical fasteners or the like. This type of approach permits more flexibility in terms of frame forms and functionality than unitary filter frames, however, it generally results in framed filters which are complicated to manufacture while often not providing an airtight seal around the filter media. For example, U.S. Pat. No. 4,692,177 describes a two-piece snap fit filter frame where each of the two pieces are three-dimensional injection molded frame pieces. Fluid bypass is prevented in this particular arrangement by placing a bead of adhesive into a groove in one of the frame pieces and subsequently forcing a top edge of the pleated filter into the adhesive bead during the snap fit assembly process. This type of framed filter would be very difficult to implement in an automated production process due to the strategic placement of the adhesive within an enclosed space and the need for rapid assembly of three three-dimension pieces coming together simultaneously with very close tolerances. A similar approach is described in U.S. Pat. No. 1,832,281, however, the filter media in this embodiment is friction gripped along the periphery of the filter media by mating flanges of the two frame elements, one of which comprises an exhaust flue. U.S. Pat. No. 2,058,669 describes a three-dimensional filter frame formed by cutting out the face portions of two corrugated boxes halves, which halves are subsequently cemented together with a pleated filter and comb-like pleat stabilizing elements. Again, this design is not susceptible to continuous manufacturing processes. A similar approach is also discussed in U.S. Pat. No. 3,513,643 where the rectangular frame is described as a conventional multi-piece aluminum frame with the frame elements welded together and the filter adhesively attached to the frame. U.S. Pat. No. 4,386,948 describes a filter for use in a respiratory device where the filter frame is a three-piece molded structure where the individual filter frame pieces and filter media are all formed of polypropylene and welded together. The filter media is held between two flanges of two injection molded polypropylene pieces with ultrasonic fusing of the three elements forming a fluid tight seal. Again, this is a complicated structure requiring multiple assembly steps. U.S. Pat. No. 5,599,446 describes an injection molded filter frame provided with a peripheral groove on one face which accepts an injection molded elastic piece which snap fits into the groove. The elastic piece is suitably attached, generally by injection molding, to the periphery of a flat filter medium. This approach generally is only suitable for use in holding a flat filter media taunt along the peripheral edge of the rigid frame similar to a window screen. PCT Publ. No. 96/29138 describes an injection molded filter frame piece which grips the edge of a filter medium by two snap fit side pieces which move toward each other and snap into a central rigid structural element. The snap fit pieces have projections that come together and hold the edges of the filter medium. Corner snap fit, frame pieces are separately provided to hold the filter media and frame to a rectangular form. The object of this invention was to provide a simple and cost effective method of manufacturing a filter frame, which can be recycled if need be. Although the individual injection molded pieces can be suitable for continuous production processes, the frame assembly with the filter element is complicated such that it would generally require hand assembly. Generally, with all the above designs, the filter frame is created by forming individual frame elements that are three-dimensional in form. These three-dimensional frame elements must be directly attached to the filter media during formation of the frame or require further assembly that requires bringing together multiple three-dimensional elements.

Other patents have proposed forming a filter frame from a die cut flat material which is subsequently formed into a filter frame by folding the frame elements together into the final three-dimensional filter frame shape. For example, Japanese Publ. Pat. Appln. 7-299317 describes a steel-type frame blank into which notches are cut to allow for tabs to be folded inward creating u-shaped channels. The notches allow the frame to be folded into a rectangular frame shape and subsequently welded together. Additional filter elements such as wire retaining elements can be provided on the opposite faces of the filter media. A much more complex shape is described in PCT Publ. WO 94/11089 where the frame blank is described as punched from any suitable sheet material such as cardboard. Two separate sheets are cut which are mirror images of each other. Each sheet is symmetrical having three sections. One section is designed to hold and maintain the pleat form along a side of the pleated filter. The second section is designed to snap fit so as to hold the terminal end of the pleated filter. The third section engages the other sheet at a corner. The two folded sheets are then brought together with the two halves held together by slats and corresponding slits of the third section. A peripheral compressible sealing material is then provided along the external portion of the assembled frame to allow the frame to be friction fit into a housing. Although this frame allows a filter to be formed from a sheet of flat material, the complex three-dimensional folding along three separate axis makes this an inherently complicated assembly to manufacture in a continuous process not to mention the need for subsequent adhesive application of a sealing strip.

The present invention is directed at trying to provide a simple and convenient way for continuously manufacturing a filter frame blank, which can then be easily assembled with either a pleated filter media or flat filter media and which is also capable of easily providing a fluid tight assembly to prevent bypass of unfiltered fluid or air.

BRIEF SUMMARY OF THE INVENTION

The invention is related to a framed filter media comprising a filter media having a fluid inlet face and a fluid outlet face with peripheral sidewalls. The peripheral sidewalls are attached to a strip frame by an adhesive-potting compound. The continuous strip frame is formed into three or more (up to an infinite number if the sidewall sections(s) is formed into a circular filter frame) sidewall sections having a substantially flat sidewall and at least two projecting filter retaining tabs which form a channel on a first face of the sidewall section for containing the adhesive potting compound. The sidewall sections are separated by corner notches extending through the retaining tabs at least to the substantially flat sidewalls. Two terminal sidewall sections meet to form a seam such that the sidewall sections circumscribe the filter media peripheral sidewalls.

The invention is further related to a method of framing a filter media comprising the steps of, not necessarily in order:

a) extruding of continuous strip frame blank comprising at least a substantially flat sidewall and at least two projecting filter retaining tabs forming a continuous channel on a first face of the continuous strip frame blank;

b) notching the filter retaining tabs to form corner notches which corner notches extend at least to the substantially flat sidewalls creating sidewall section between the corner notches and optionally scoring first and/or second faces of the sidewall portions to form living hinges;

c) cutting the continuous strip frame blank into discrete strip frame blanks;

d) applying an adhesive potting compound into the channels on the first face of the strip frame blanks;

e) attaching a filter media to at least one sidewall section first face having the adhesive potting compound;

f) wrapping the remaining sidewall sections around the filter media wherein the sidewall sections lengths generally correspond to filter media sidewall lengths;

g) imbedding the filter media sidewalls into the adhesive potting compound in the sidewall section channels; and h) setting the adhesive potting compound to form a framed filter wherein the sidewall sections meet to form a seam such that the sidewall sections completely circumscribe the filter media peripheral sidewalls.

DETAILED DESCRIPTION OF THE PREFERRED EMBODIMENTS

Figure 1:
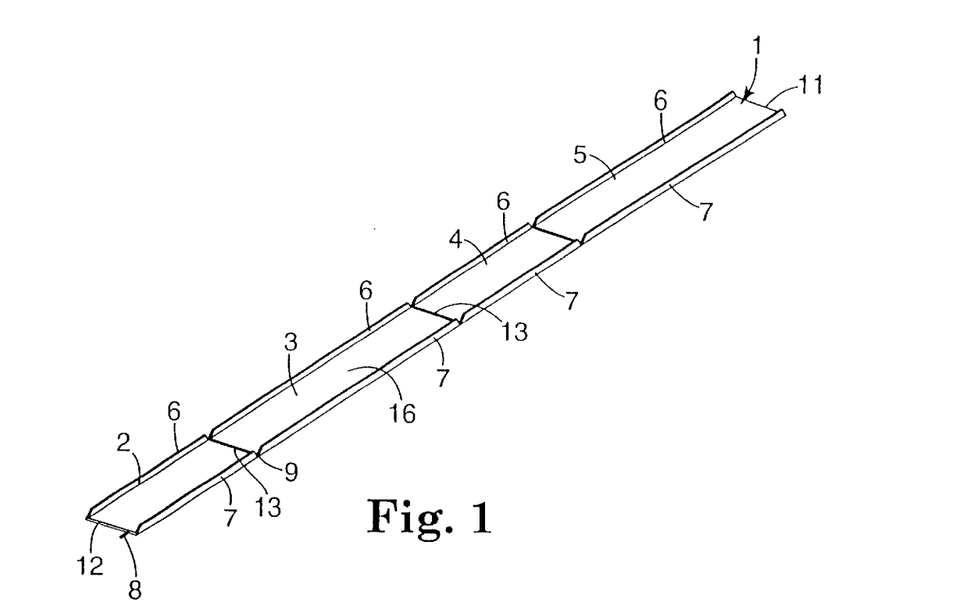
FIG. 1 is a perspective view of a discrete strip frame blank used to form the filter frame of the invention.
Figure 2:
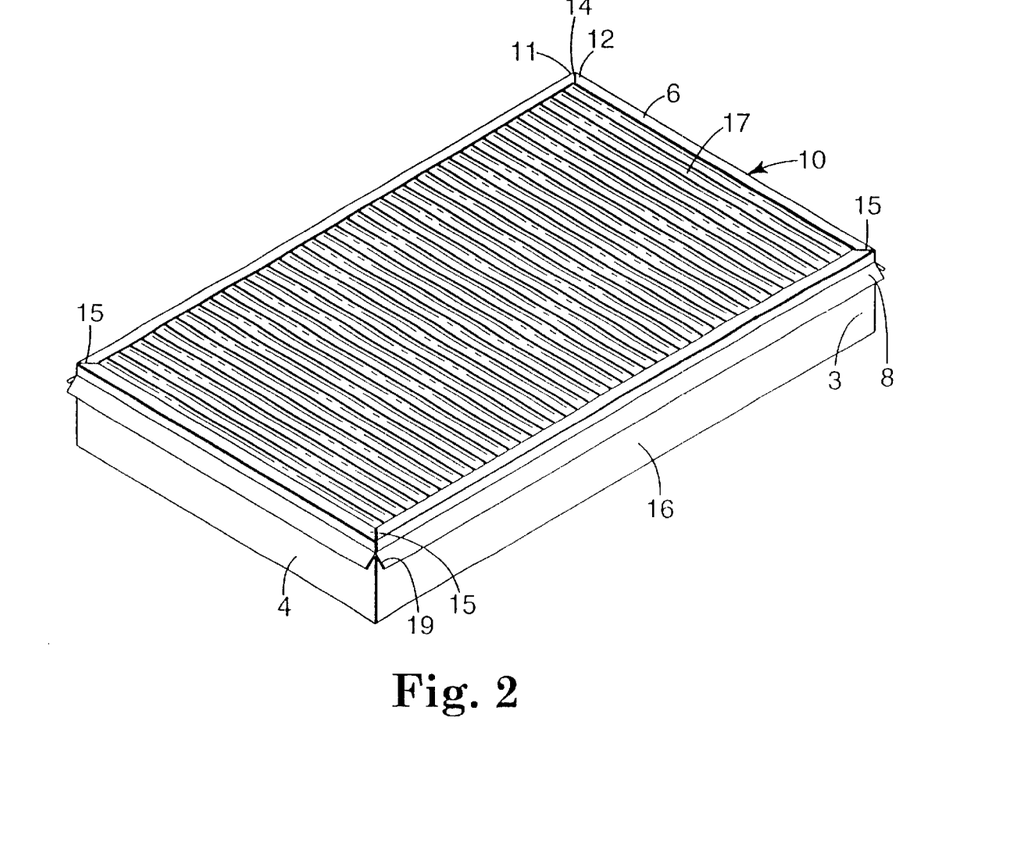
FIG. 2 is a perspective view of an assembled filter of the present invention using the strip frame blank filter of FIG. 1 and a pleated filter media.

The invention filter frame and method of framing a filter media relies on an extruded integral strip frame blank 1 as shown in FIG. 1 which is an elongate element divided into opposing sidewall sections by post-extrusion notching and/or scoring. In the embodiment shown in FIG. 1, the two elongate opposing sidewall sections 2 and 4 form the end walls of the finished filter frame 10 as shown in FIG. 2. The elongate opposing sidewall sections 3 and 5 form the longitudinal sidewalls of the finished filter frame 10. The strip frame blank 1 further includes filter retaining tabs 6 and 7. These filter retaining tabs serve to contain the adhesive-potting compound used to attach the filter material to the sidewalls and also helps to contain the filter material to prevent movement in and out of the plane of the finished filter frame. The filter retaining tabs also act as reinforcing beams to stiffen the filter frame structure. The filter retaining tabs generally are formed of the same thermoplastic material forming the sidewall sections with the filter retaining tabs generally being from 4 to 8 mm in height. Further, provided in the embodiment shown in FIG. 1 is an integral extruded or coextruded sealing lip 8 which can be formed of the same or different thermoplastic material forming the sidewall sections 2–5. The sealing lip 8 is an elastically deformable thin ridge-like element where the elasticity generally is provided by deformation resistance of the sealing lip thermoplastic material. This property of elastic deformation is generally provided by a plastically or elastically deformable material, for example, polyolefins such as: polypropylenes, polyethylenes, ethylene/propylene, ethylenepropylenediene copolymers, blends, and the like; polyesters; nylons; ABS copolymers; styrene/diene block copolymers, polyvinylchlorides; etc. The filter frame blank sidewall sections are generally formed of thermoplastic polymers that are relatively rigid, which may also be polymers exhibiting elastic deformation resistance. Suitable polymers for forming the sidewall sections include polyolefins such as: polypropylenes, polyethylenes, ethylene/propylene copolymers, blends, and the like; polyesters; nylons; ABS copolymers; polyvinylchlorides; etc. These polymers can also include particulate additives for added rigidity such as talc, glass fibers, or the like at levels generally less than 30 percent by weight.

Generally the strip frame blank 1 is cut from a substantially continuous strip frame material with the cut portions forming ends 11 and 12. The cut strips frame blank 1 is then either subsequently, during or prior to cutting, provided with corner notches 9 on the filter retaining tabs. To allow the strip frame blanks to be folded into a rectangular form without pushing each other out of a common plane, the corner notches are preferably about 90° cutouts. If other filter forms are desired, more and/or different notch dimensions or angles can be provided. For example, hexagonal or like filter frame forms could be created. Also cut notches of less than 90° can be provided if the terminal ends of the retaining tabs defining the notches are allowed to overlap. Generally the notches angles are equal to or less than the angle that the sidewall sections form when they meet. In any event, the notches should extend across the full width of the tabs 6 and 7 to the flat portion 16 of the sidewall sections 2, 4, 3, and 5. This is to allow the sidewall sections to easily bend or fold freely at the notched section. A further notch or cut 19 is provided on the opposite face cutting into the sealing lip 8 opposite the notched corner section 9 when provided. This cut 19 is generally a straight cut, removing a minimal amount of the sealing lip material, or score. Preferably, the notched sections of the strip frame blank are also provided with score lines 13 to form living hinges that facilitate folding of the strip frame blank sidewall sections into the final filter frame forms. These score lines 13 can easily be created by a hot wire, transverse cutting with rotary cutting blades, plunge cutting with a blade knife, or the like. The distance between the notched sections of the strip frame blank define a sidewall section and generally correspond to the length of the filter media sides which engage that sidewall section. However the two terminal sidewall sections may together engage a single filter media side, in which case the individual terminal sidewall sections may be shorter than the filter media side which it engages. Generally, however, the filter media sides are 2 to 3 mm shorter than the distance between the notched sections to allow for the adhesive-potting compound.

A finished framed filter formed from the FIG. 1 blank is shown in FIG. 2 where a pleated filter media material 17 having an upstream and downstream face is contained within the assembled strip frame blank 1. The sealing lip 8 projects radially outward from the frame to provide sealing engagement with a filter holding frame (not shown). The 90° corner notches 9 create continuous corner details 15 by butting engagement of the filter retaining tabs 6 and 7 on the sidewalls section. The pleated filter media 17 is maintained within the folded filter frame blank in sealing engagement with the sidewall sections by provision of a suitable adhesive potting compound. The adhesive potting compound 18 also sealing engages the two strip frame blank ends 11 and 12 on two terminal sidewall sections to form a corner seam 14. The assembled filter 10 is a rigid rectangular filter form where the pleated filter media 17 is in sealing engagement with the four sidewall sections by the adhesive potting compound 18, which adhesive potting compound 18 and attached filter media 17 also provides added rigidity to the assembled filter 10. Sealing between the framed filter 10 and any filter housing (not shown) is provided by the sealing lip 8 which provides a substantially continuous edge seal along the outer periphery of the filter frame 10. The sealing lip also provides for frictional engagement with the surrounding filter housing.

Figure 3:
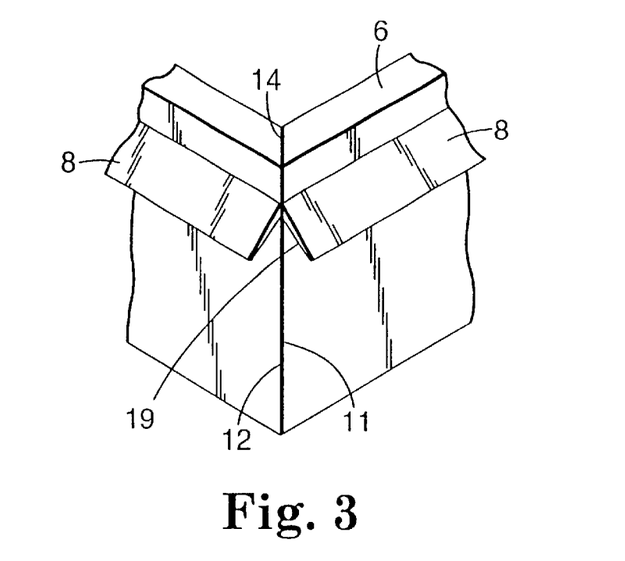
FIG. 3 is a cutaway perspective view of a corner portion of the filter frame of FIG. 2.
Figure 4:
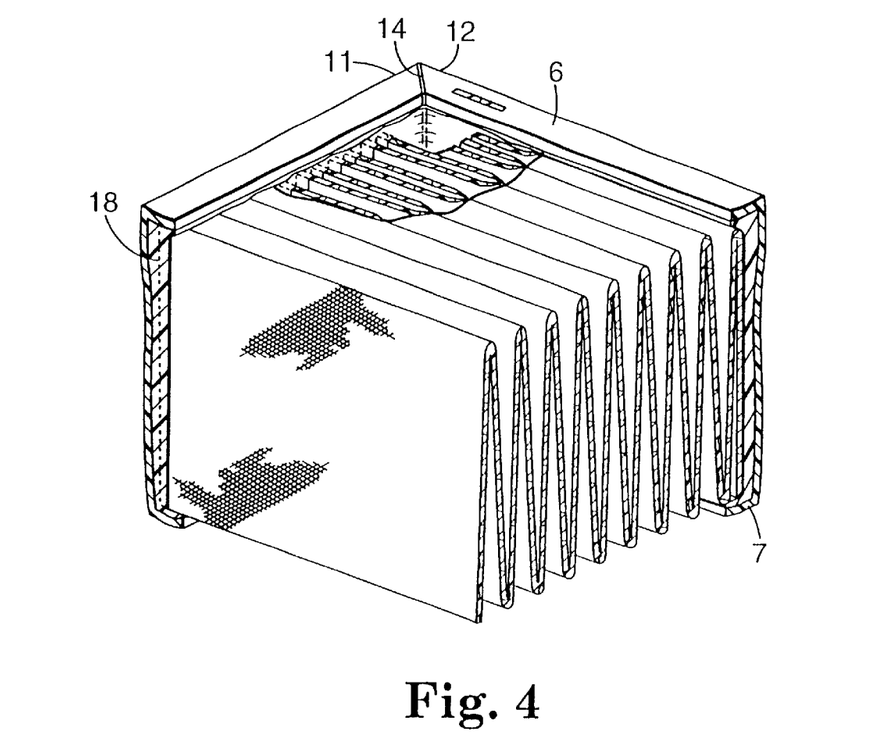
FIG. 4 is a cutaway perspective view of the FIG. 3 corner portion viewed from the inside of the filter frame.

FIG. 3 shows a cutaway perspective view of the end butt seam 14 created, for example, in the first embodiment shown in FIGS. 1 and 2. The two abutting ends 11 and 12 of the strip frame blank are held in position by the adhesive potting compound in the u-shaped inner channel created by the strip frame blank flat sidewall sections walls 16 and the filter retaining tabs 6 and 7. This is shown in more detail in the cutaway perspective view shown in FIG. 4. The pleated filter media 17 is retained in the strip frame blank by an adhesive potting material 18, which adhesive also creates the corner seam 14 holding together the two end portions of the strip frame blank and the filter retaining tabs 6 and 7.

Figure 5:
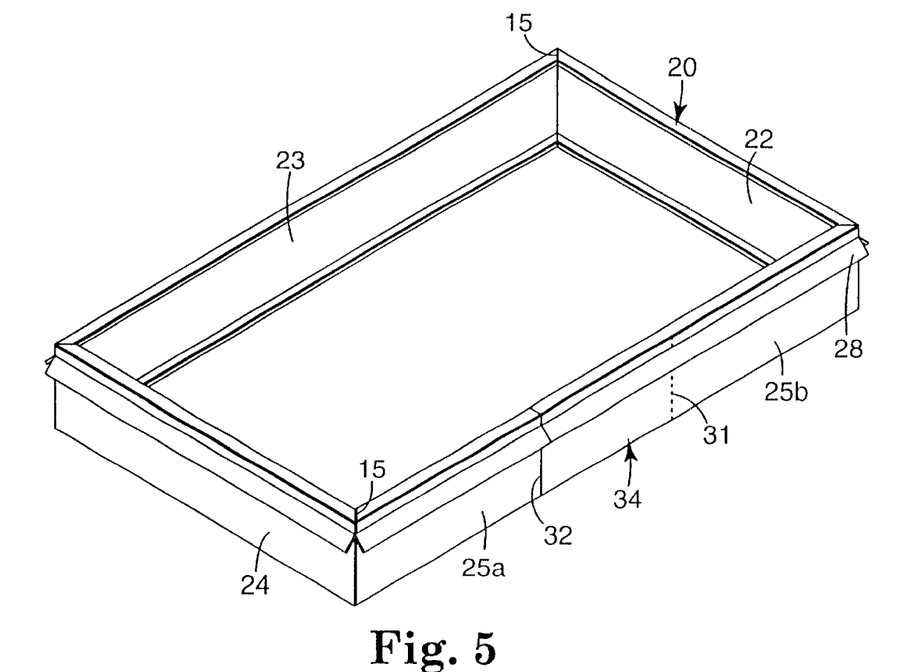
FIG. 5 is a perspective view of a second embodiment of filter frame of the invention without a filter media.

An alternative embodiment of an assembled filter frame formed from a strip frame blank 20 is shown in FIG. 5. In this embodiment the seam 34, between the filter frame blank ends 31 and 32 is created by an overlapping side seam 34 rather than an end butt seam as shown in FIG. 2. The sealing lip 28 segments and the filter tab segments generally must be removed from the portions of the sidewall segment 25a which underlies sidewall section segment 25b to allow the creation of a flush overlapping side seam 34. The ends 31 and 32 of the strip frame blank 20 generally overlap by at least 10 mm, preferably at least 15mm. However, where an end butt seam is created along a sidewall, no overlap is required. Due to its weakening effect, end butt seams are preferred only where the sidewall is otherwise reinforced such as by pleats of an attached pleated filter, dovetail type butt joints, or additional reinforcing elements. The opposing sidewall section 23 is opposite the overlapping sidewall section segments 25a and 25b with opposing sidewall sections 24 and 22 forming the filter frame endwalls. As the filter strip frame blank ends 31 and 32 in this embodiment do not create an end butt joint at a corner, four corner notches must be provided to allow for the creation of the four corner elements 15 as described above with respect to FIG. 1.

Figure 7:
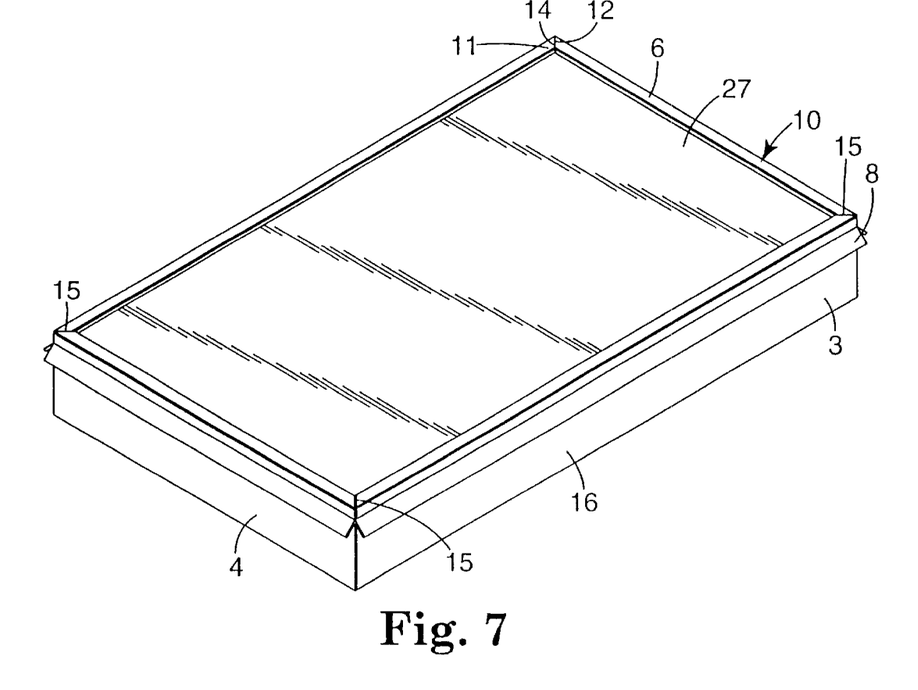
FIG. 7 is a perspective view of the filter frame of FIG. 2 framing a flat filter media.

FIG. 7 shows an alternative embodiment where a flat filter media 27 is retained in the strip frame blank, filter frame 10 as shown in FIG. 1.

Figure 8:
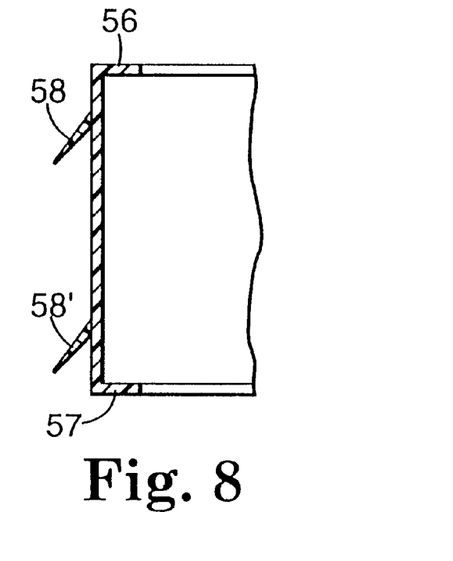
FIG. 8 is a cutaway side view of an alternative embodiment of a sealing lip usable on the invention framing strip.
Figure 9:
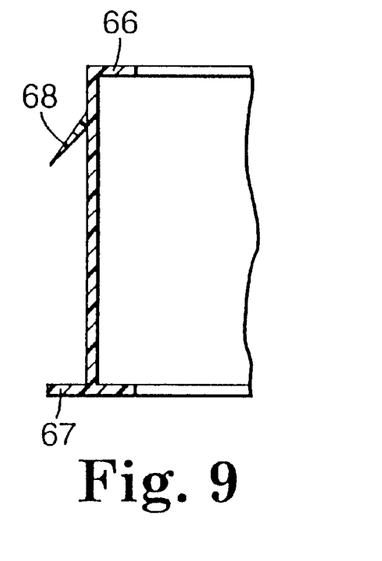
FIG. 9 is a cutaway side view of an alternative embodiment of a sealing lip usable on the invention framing strip.
Figure 10:
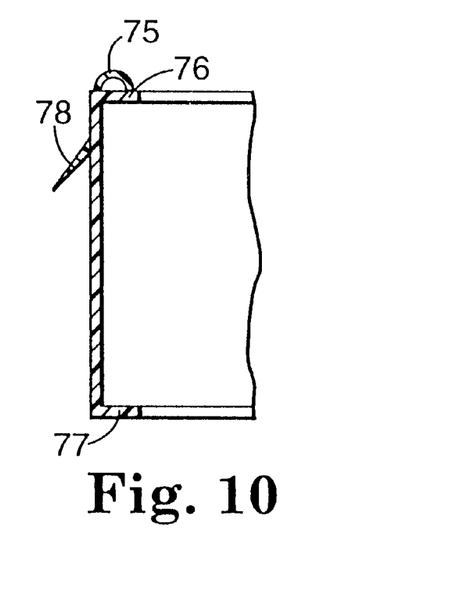
FIG. 10 is a cutaway side view of an alternative embodiment of a sealing lip usable on the invention framing strip.
Figure 11:
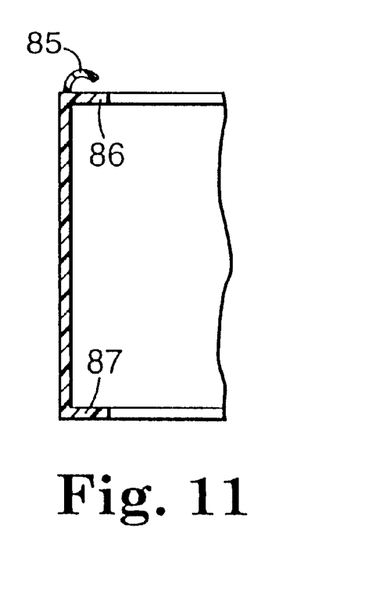
FIG. 11 is a cutaway side view of an alternative embodiment of a sealing lip usable on the invention framing strip.

Alternative embodiments for the sealing lip are shown in FIGS. 8–11. In FIG. 8, there is provided an upper sealing lip 58 and a lower sealing lip 58' of thin elastically deformable ridges on a strip frame blank outer sidewall provided with filter retaining tabs 56 and 57. As with the FIG. 1 embodiment, the sealing lip when bent provides an elastic restoring force which presses the ridge-like sealing lip into the side of the filter housing creating a fluid tight seal. In the embodiment of FIG. 9, a ridge-like sealing lip 68 is provided on an upper edge region of the strip frame blank with the lower edge of the strip frame blank provided with a projection of the lower filter retaining tab 67, which projects outside the face of the strip frame blank. The strip frame blank is also provided with upper filter retaining tab 66. The extension of the filter retaining tab provides additional rigidity for the strip frame blank and also additional sealing capabilities. Generally however, this projecting retaining tab 67 would not be in bending engagement with an outer filter holding frame but rather provide a lip gasketing element or fit in sliding engagement with a corresponding slot provided in the filter holding frame. FIGS. 10 and 11 show the possibility of providing further outward projecting sealing lip structures 75 and 85 on the filter retaining tabs 76 and 86, respectively with the sealing lip 78 also provided on the FIG. 10 embodiment. Such structure could also be provided on the filter retaining tabs 77 and 87, or the sidewalls if required for a particular application. Sealing lip 75 is formed of a gasket-type seal material in the form of a semicircular profiled structure which when compressed provides sealing engagement with an opposing surface of a filter holding frame or the like by an elastic deformation restoring force. Gasket seal 85 is an alternative to the sealing gasket of FIG. 10 provided with an unattached edge. This gasket-type sealing lip construction has the advantage of allowing a continuous seal to be formed as this type of seal will not necessarily be cut by the notching process (it is merely pushed of the way).

Figures 12, 13, 14:
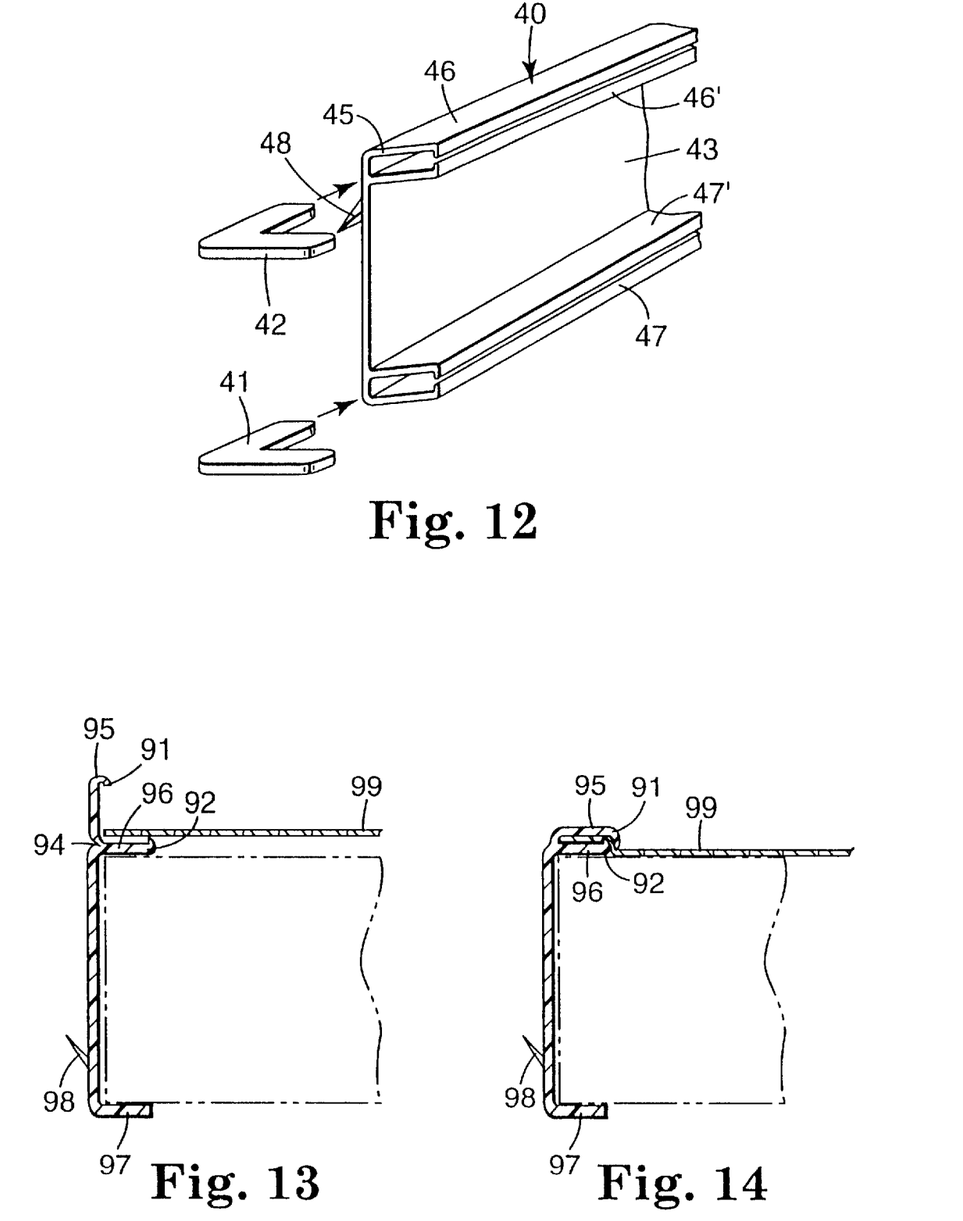
FIG. 12 is a cutaway perspective view of an alternative embodiment of a corner seam of a filter frame.
FIGS. 13 and 14 are cutaway side views of an alternative embodiment of the invention including a prefilter.

The embodiment of FIG. 12 is similar to the FIG. 2 embodiment except that the filter retaining tabs 46' and 47' include secondary tabs 46 and 47 designed to create a double walled channel. The sealing lip 48 is provided on sidewall 43. The channel can be open, as shown in FIG. 12, or closed as desired. The channels can be used to accommodate keys 41 and 42 to interlock abutting ends 45 of the strip frame blank 40. The keys 41 and 42 can be used alone or with adhesive or other suitable bonding mechanism. This structure has additional rigidity due to the double walled filter retaining tabs and more secure abutting filter frame seams when the keys are used.

The embodiment of FIGS. 13 and 14 is similar to the FIG. 2 embodiment except that the sealing lip 98 is upturned and a filter retaining tab 96 has been modified to engage a secondary movable retaining tab 95 that pivots about a living hinge 94. Filter retaining tab 97 is as in the FIG. 2 embodiment. The movable tab 95 has lip structure 91 that engages a corresponding lip structure 92 on the filter retaining tab 96 in a snap fit engagement. The mating tabs 95 and 96 can be used to hold a prefilter 99 or like element.

Figure 6:
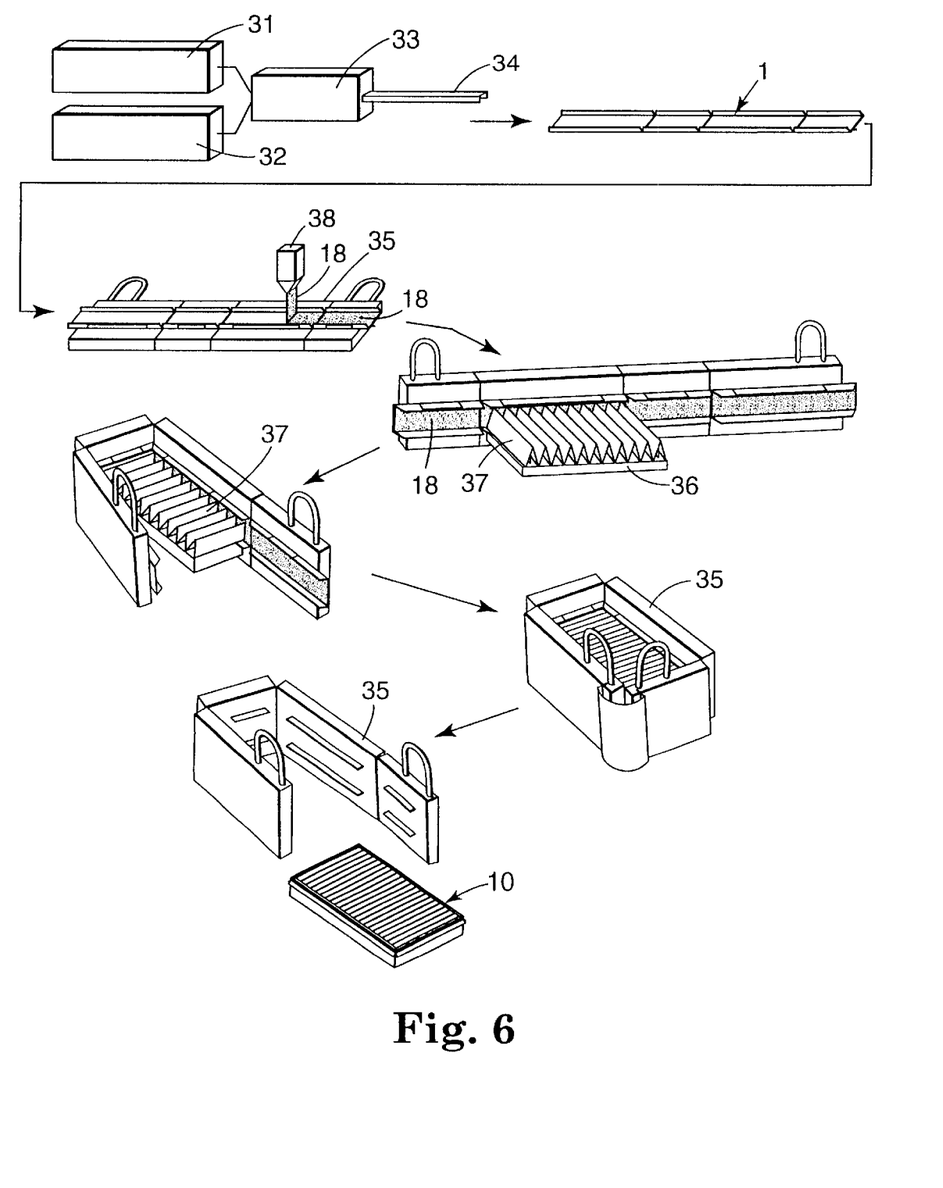
FIG. 6 is a schematic view of the invention process for framing a filter, as shown in FIG. 2.

The method of assembling a strip frame blank 10, such as shown in FIG. 1, into an assembled filter frame is shown in FIG. 6 with respect to a pleated filter element. Pair of extruders 31 and 32, containing the same or different polymers, are used to feed molten polymer into a feedblock and die 33. A single extruder could also be used where a single polymer is used to form the strip frame blank. Alternatively, a three layer die (e.g., a Cleoron™ type die), or more, could be used with a splitter used to feed one polymer flowstream into two portions of the die, or alternatively a third block extruder could be used. Generally, the strip frame sidewall sections 2, 3, 4 and 5, including the filter retaining tabs 6 and 7, and the flat sidewall section walls 16 are formed of the same polymer. The filter sealing lip 8 can be formed of the same or a different polymer than the sidewall sections depending on the sealing lip requirements and the polymer selected for the sidewall sections. The profile extruded blank 34 is then cut into discrete filter frame blanks 1 which are simultaneously, concurrently or subsequently notched and optionally scored such as by transverse cutting with a rotary knife blade. The formed notched and scored filter frame blanks 1 are then placed in a framing jig 35 or the like. The framing jig 35 has friction retaining strips placed on the framing jig which allow folding of the framing jig around the base fixture 36 to provide forming registration for the filter assembly. The channels are filled with an adhesive potting compound 18 by, for example, spray deposition, a hot melt applicator 38, or the like. The adhesive potting compound provides a generally fluid tight seal and can have a depth or from 0.25 to 4.0 mm, preferably 0.5 to 2.0 mm. The adhesive potting compound could also be provided prior to placement of the frame into the jig if desired. With the preferred hot melt type adhesive potting compound the hot adhesive also helps the filter frame blank bend when formed around a filter in a framing jig or the like. A preformed filter media positioned on base fixture 36 is then placed on the adhesive potting compound on one sidewall section, preferably a sidewall section not intended to form a side seam. The filter media should inherently have sufficient rigidity to resist compression by the adhesive potting compound or be reinforced as needed. This reinforcement could only be in one direction, for example with a pleated filter, or both, for example with a non-rigid flat filter. The filter frame in the framing jig is then wrapped around the base fixture 36 and filter media 37 pushing the ends of the filter media into the adhesive potting compound in the remaining sidewall sections and concurrently achieving final dimensional registration for the filter assembly through engagement with base fixture 36. The adhesive potting compound at this point has a viscosity low enough to allow for the filter media to easily penetrate into the adhesive potting compound yet does not sag and flow out of the strip frame channel. The framing jig is then permitted to remain closed for a time sufficient to allow the adhesive potting compound to set, at which time the formed filter 10 is released from the jig.

EXAMPLE

Two extruders were connected to a feed block/coextrusion die assembly capable of producing a continuous strip frame material, including a sealing lip, having a profile similar to that illustrated in FIG. 2. Sidewall and retaining tab segments of the strip frame material were 0.75–1.00 mm thick, the sidewall portion of the strip frame material was 32 mm wide, the filter retaining tabs were 5 mm wide, and the sealing lip was 6 mm long and had a tapered profile ranging from 1.5 mm at its juncture with the sidewall to 0.5 mm at its tip. The sidewall and filter retaining tab portions of the strip frame were formed from Polyfort™, a talc filled polypropylene resin (20% by weight talc) available from A. Schulman Inc. which was delivered to the feedblock/die assembly as a molten stream at a temperature of 205° C. from the first extruder. The integral sealing lip portion of the strip frame material was formed from Santoprene™, available from Ashland Chemical Co., which was delivered to the feedblock/die assembly as a molten stream at a temperature of 205° C. from the second extruder. Living hinges were formed in the strip frame material by cutting indexed score lines into the two sidewall surfaces of the strip frame material. Score lines were cut into the inner, or included surface between the retaining tabs, and the retaining tabs concurrently notched to a 90° included angle using a utility knife blade available from Stanley, USA adjusted to cut into the sidewall surface to a depth of approximately 0.15 mm. Score lines and notches were cut into the strip frame materials at intervals of 135 mm and 230 mm in an alternating manner, defining frame segments which subsequently become end and side wall portions of the completed framed filter (described below). Indexed score lines were then cut into the opposite, or outer, sidewall surface to a depth of approximately 0.15 mm while concurrently cutting the sealing lip (90° angle) using a rotary knife (available from OLFA, Japan) to complete formation of living hinges. Discrete strip frame blanks were subsequently cut from the continuous strip frame material by cutting the continuous strip at every fourth score line using a combination of the above two cutting methods.

A filter element blank was formed by pleating a 133 mm×150 cm portion of a synthetic nonwoven web at 28 mm intervals and placing the pleated web on a base fixture (135 mm×230 mm) to create a filter element blank (133 mm×228 mm) having a peak to peak spacing of 8.8 mm. The pleat stabilizing jig maintained the pleat spacing of the pleated filter web through subsequent processing as well as providing a forming register to shape the strip frame into the desired final filter shape.

The scored and notched strip frame blank (described above) was placed in a framing jig similar to item 35 of FIG. 6. The framing jig comprised four rectangular components, each incorporating two retaining steel elements spaced 32 mm apart which frictionally retained the strip frame blank in register in the framing jig. The retaining strips were positioned approximately 13 mm from the longitudinal edges of each framing jig component so as to allow the jig to be placed around the base fixture. The four framing jig components were connected by three hinges which allowed the jig to be formed around the pleat stabilizing jig. The components of the framing jig were 225 mm×58 mm, 135 mm×58 mm, 230 mm×58 mm, and 130 mm×58 mm and were assembled so that the two shorter components (one side component and one end component) formed the unhinged terminal ends of the framing jig. A spring clip is placed on one edge of these components proximal to their unhinged ends to provide a means for closing the framing jig around strip frame blank.

The framed filter assembly was prepared by inserting a discrete strip frame blank into the framing jig, positioning the living hinges of the frame blank over the hinges of the framing jig. A ribbon of hot melt adhesive (#9041, available from Bostic Inc., Middleton, Mass.) was dispensed from a Dynatec Hot Melt dispenser at a temperature of approximately 180° C. into the strip frame blank, filing the channel created by the retaining tabs and the sidewall portions of the strip frame blank to a depth of approximately 0.75 mm. The framing jig was then rotated 90° and formed around the filter element blank, potting the pleated filter edges and end pleats into the hot melt adhesive. The framing jig was tightly closed around the base fixture and a spring steel clamp looped around the two proximal anchors to keep the framing jig tightly registered with the base fixture until the hot melt adhesive solidified. After the adhesive had solidified, the clamp was removed and framed filter separated from the framing and base fixture.

What is claimed is:

1. A method of framing a filter media comprising the steps of
   a) extruding of continuous strip frame blank comprising at least a substantially flat sidewall and at least two projecting filter retaining tabs forming a continuous channel on a first face of the continuous strip frame blank;
   b) notching the filter retaining tabs to form corner notches which corner notches extend at least to the substantially flat sidewalls creating sidewall section between the corner notches;
   c) cutting the continuous strip frame blank into discrete strip frame blanks;
   d) applying an adhesive potting compound into the channels on the first face of the strip frame blanks;
   e) attaching a filter media to at least one sidewall section first face having the adhesive potting compound;
   f) wrapping the remaining sidewall sections around the filter media wherein the sidewall sections lengths generally correspond to filter media sidewall lengths;
   g) imbedding the filter media sidewalls into the adhesive potting compound in the sidewall section channels; and
   h) setting the adhesive potting compound to form a framed filter wherein the sidewall sections meet to form a seam such that the sidewall sections completely circumscribe the filter media peripheral sidewalls.

2. The method of framing a filter media of claim 1 wherein the terminal sidewall sections meet to form a butt joint when the discrete strip frame blank is wrapped around the filter media.

3. The method of framing a filter media of claim 1 wherein an overlapping sidewall joint is formed where the filter terminal sidewall sections meet when the discrete strip frame blank is wrapped around the filter media.

4. The method of framing a filter media of claim 1 further comprising extruding a sealing lip on a second face of the strip frame blank.

5. The method of framing a filter media of claim 1 wherein the adhesive potting compound is applied to the strip frame blank after it is cut into discrete strip frame blanks.

6. The method of framing a filter media of claim 1 wherein the adhesive potting compound is a hot melt adhesive.

7. The method of framing a filter media of claim 1 wherein the filter retaining tabs are formed after the continuous strip frame blank is cut into discrete strip frame blanks.

8. A framed filter media comprising a filter media having a fluid inlet face and a fluid outlet face with peripheral sidewalls, the peripheral sidewalls being attached to a strip frame on at least one sidewall wherein the strip frame has a sidewall section having a substantially flat sidewall with a first face facing the filter media and a second face of the sidewall having at least one elastically deformable sealing lip wherein the sidewall sections are formed of a first thermoplastic polymer and the at least one sealing slip is formed of a second thermoplastic polymer and the sidewall section and sealing lip are integrally formed by coextrusion.

9. The framed filter media of claim 8 wherein the at least one sealing lip is on the substantially flat sidewall.

10. The framed filter media of claim 8 wherein the at least one sealing lip is on a filter retaining tab.

11. The framed filter media of claim 8 wherein the at least one sealing lip is a thin projecting ridge structure.

12. The framed filter media of claim 11 wherein the sealing lip is a profiled structure capable of sealing when compressed.

13. The framed filter media of claim 12 where the profiled structure is semicircular profile attached at least at one side of the profiled structure to a filter retaining tab.

14. The framed filter media of claim 8 wherein the strip frame is a unitary strip frame attached to the filter media by an adhesive potting compound where the unitary strip frame is formed into three or more sidewall sections having at least two projecting filter retaining tabs which form a channel on a first face of the sidewall sections for containing the adhesive potting compound, the sidewall sections being separated by corner notches which corner notches extend through the filter retaining tabs at least to the substantially flat sidewalls, two terminal sidewall sections meet to form a seam such that the sidewall sections completely circumscribe the filter media peripheral sidewalls.

15. The framed filter media of claim 14 wherein the two terminal sidewall sections meet at a corner forming a butting corner seam by adhesive attachment of ends of the two terminal sidewall sections with the adhesive potting compound.

16. The framed filter media of claim 14 wherein the terminal sidewall sections meet at a sidewall forming a seam by adhesive attachment with the adhesive potting compound.

17. The framed filter media of claim 16 wherein the sidewall seam is formed by overlapping portions of the two terminal sidewall sections.

18. The framed filter media of claim 14 wherein the notch angle is equal to or less than the angle at which the sidewall sections meet.

19. The framed filter media of claim 18 wherein the angle at which the sidewall sections meet and the notch angle are both about 90°.

20. The framed filter media of claim 14 wherein the sidewalls of the sidewall sections are scored between the corner notches on opposing filter retaining tabs.

21. The framed filter media of claim 14 wherein the at least one of the two filter retaining tabs has a secondary tab forming a secondary channel.

22. The framed filter media of claim 14 wherein the secondary channels accommodate a key element for holding together two abutting ends of the filter frame.

23. The framed filter media of claim 14 wherein at least one filter retaining tab is in direct opposing relation to a secondary movable tab which two tabs engage by mating engaging structures on the opposing tabs.

24. The framed filter media of claim 8 wherein the filter media comprises a pleated filter media.

25. The framed filter media of claim 8 wherein the sealing lip is formed of a thermoplastic elastomer.

26. A framed filter media comprising a filter media having a fluid inlet face and a fluid outlet face with peripheral sidewalls, the peripheral sidewalls being attached to a unitary strip frame by an adhesive potting compound where the unitary strip frame is formed into three or more sidewall sections, the sidewall sections having a substantially flat sidewall and at least two projecting filter retaining tabs which form a channel on a first face of the sidewall sections for containing the adhesive potting compound, the sidewall sections being separated by corner notches having notch angles which corner notches extend through the filter retaining tabs at least to the substantially flat sidewalls, two terminal sidewall sections meet to form a seam such that the sidewall sections completely circumscribe the filter media peripheral sidewalls and the angle at which the sidewall sections meet and the notch angles are both about 90°.

27. A framed filter media comprising a filter media having a fluid inlet face and a fluid outlet face with peripheral sidewalls, the peripheral sidewalls being attached to a unitary strip frame by an adhesive potting compound where the unitary strip frame is formed into three or more sidewall sections, the sidewall sections having a substantially flat sidewall and at least two projecting filter retaining tabs which form a channel on a first face of the sidewall sections for containing the adhesive potting compound, the sidewall sections being separated by corner notches having notch angles which corner notches extend through the filter retaining tabs at least to the substantially flat sidewalls, two terminal sidewall sections meet to form a seam such that the sidewall sections completely circumscribe the filter media peripheral sidewalls wherein the secondary channels accommodate a key element for holding together two abutting ends of the filter frame.

28. A framed filter media comprising a filter media having a fluid inlet face and a fluid outlet face with peripheral sidewalls, the peripheral sidewalls being attached to a unitary strip frame by an adhesive potting compound where the unitary strip frame is formed into three or more sidewall sections, the sidewall sections having a substantially flat sidewall and at least two projecting filter retaining tabs which form a channel on a first face of the sidewall sections for containing the adhesive potting compound, the sidewall sections being separated by corner notches having notch angles which corner notches extend through the filter retaining tabs at least to the substantially flat sidewalls, two terminal sidewall sections meet to form a seam such that the sidewall sections completely circumscribe the filter media peripheral sidewalls wherein at least one filter retaining tab is in direct opposing relation to a secondary movable tab which two tabs engage by mating engaging structures on the opposing tabs.

* * * * *